R. H. McDOWELL.
TOY.
APPLICATION FILED FEB. 18, 1919.
1,323,196.
Patented Nov. 25, 1919.
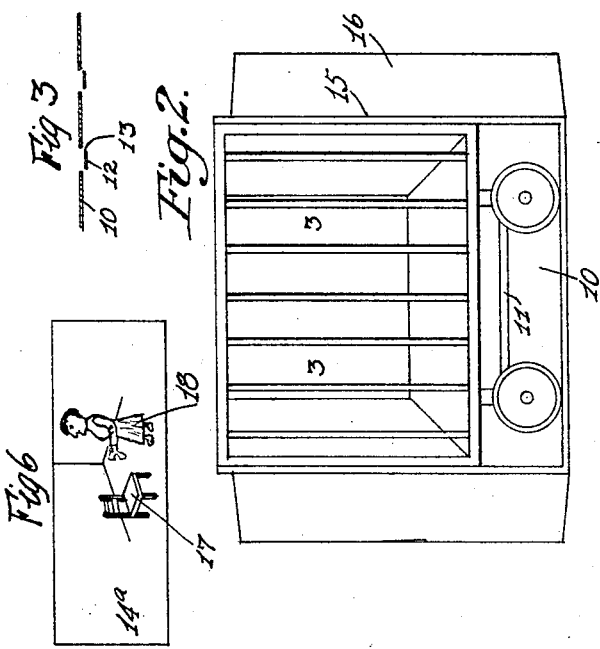
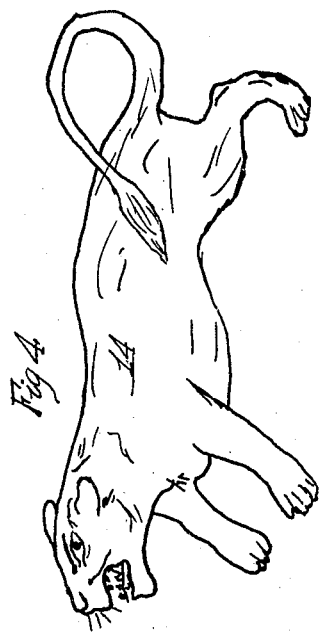
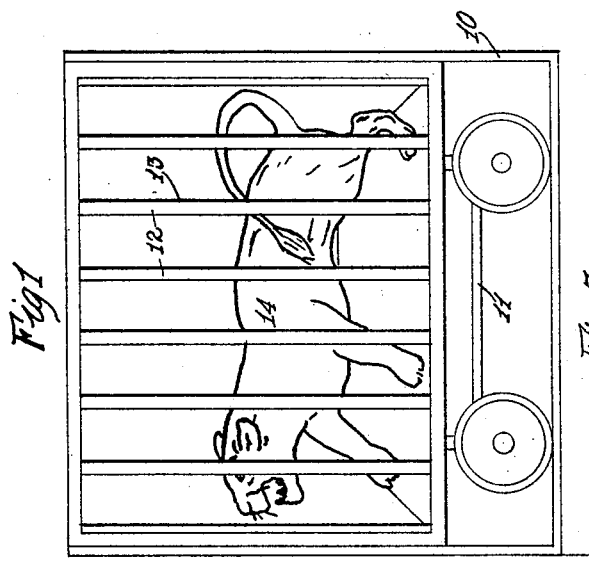
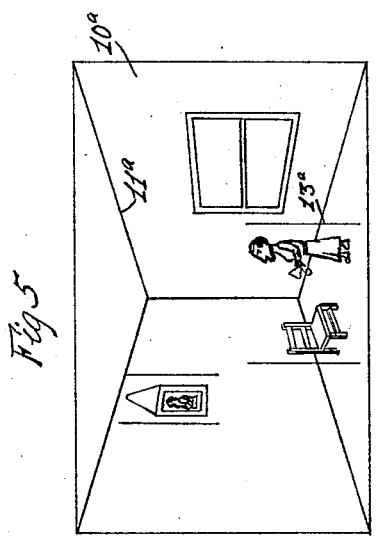
Witness
Nevin A Trissel
Inventor
Robert H. McDowell.
By Orwig & Bair Attys

UNITED STATES PATENT OFFICE.

ROBERT H. McDOWELL, OF MARSHALLTOWN, IOWA.

TOY.

1,323,196.          Specification of Letters Patent.          Patented Nov. 25, 1919.

Application filed February 18, 1919. Serial No. 277,721.

*To all whom it may concern:*

Be it known that I, ROBERT H. McDOWELL, a citizen of the United States, and a resident of Marshalltown, in the county of Marshall and State of Iowa, have invented a certain new and useful Toy, of which the following is a specification.

The object of my invention is to provide a toy of very simple and inexpensive construction.

A further object is to provide a sheet of stiff paper or cardboard having printed or otherwise marked thereon a representation of a receiving compartment, such, for instance, as a room or a cage, the sheet being cut on certain lines, so that cardboard or paper figures of animals, dolls, people or other objects may be slipped between certain parts of the sheet and other parts thereof, so that when the device is completed there is represented, for instance, a room with figures therein, or a cage with an animal behind the bars of the cage. The sheet is preferably scored or otherwise marked along certain lines so that a portion of the sheet may be turned back to form a support, whereby the entire device may be held upright.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a plan view of a toy embodying my invention, the side wings being folded under out of the way.

Fig. 2 shows a plan view of one sheet of my picture toy.

Fig. 3 shows a sectional view taken on the line 3—3 of Fig. 2.

Fig. 4 shows a plan view of the second sheet of my improved toy.

Fig. 5 shows a plan view of a modified form of my device comprising a sheet having represented thereon the interior of a room; and Fig. 6 shows a second sheet designed to be used with the form of the sheet shown in Fig. 5.

In the accompanying drawings, I have used the reference numeral 10 to indicate generally a sheet of stiff paper or cardboard having thereon indicating lines 11 for representing a cage having the bars 12. The sheet is provided with slits 13 along the lines of the bars as illustrated in Figs. 1 and 3.

A second sheet 14 is provided having represented thereon an animal. The second sheet is inserted through the slits 13 with the bars in front of the second sheet, and other parts of the first sheet will be back of the second sheet.

When the device is thus completed it will have the appearance of a cage with an animal received therein.

It will be understood that the figures such as those shown in Fig. 4 may be drawn or otherwise marked on sheets, so that children may cut them from the sheets and color them.

The sheet 10 may be scored along the lines 15 so that the under wings 16 may be folded back to form a support for holding the sheet 10 in its upright position.

In a device of this kind a circus menagerie may be provided for children, and the children can arrange the animals in different cages or take them out of the cages or put them in as they may desire.

In Figs. 5 and 6 I have shown my invention embodied in a slightly different form. In Fig. 5 I have shown the sheet $10^a$ having thereon indicating lines or marks $11^a$ for representing the interior of a room.

The sheet $10^a$ is provided with parallel vertical slits $13^a$. A second sheet $14^a$ has represented thereon figures or objects such as a chair 17, and a doll 18. The sheet $14^a$ is inserted through the slits $13^a$ so that the figures 17 and 18 appear in the completed picture.

It will be seen that my invention may be made in a great variety of forms embodying the same general idea of a sheet having represented thereon the interior of a room, and another sheet having represented thereon figures.

The first sheet is provided with slits through which the second sheet may be inserted for giving the appearance of figures in the room or compartment.

It is my intention to cover by my claims any modified forms of structure which may be included within the real spirit and scope of my invention, and within the scope of such claims.

I claim as my invention.

1. A device of the class described, comprising a stiff sheet, said sheet being formed with a plurality of slits, said sheet having on its face indicating marks for representing between certain of the slits the outside of the compartment, and between certain of the slits the inside of the compartment, a second sheet having an object represented thereon inserted through said slits, so that parts of the first sheet representing the outside of the compartment will be in front of the second sheet.

2. A device of the class described, comprising a stiff sheet having marked on its face the representation of a compartment, and having strips representing the outside of such compartment, a second sheet having an object represented thereon, said sheets having coacting parts, whereby they may be connected together, with the parts of the first sheet representing the outside of said compartment in front of the second sheet.

3. A device of the class described, comprising a stiff sheet, having marked on the face thereof a representation of an animal cage, having bars, said sheet being provided with slits along the outline of said bars, a sheet having represented thereon an animal inserted through said slits with the portion of the first sheet representing the bars in front of the second sheet, whereby there will be produced the appearance of an animal in a cage.

4. In a device of the class described, a sheet of resilient material having represented on its face the interior of a compartment, said sheet being provided with parallel slits, a second sheet having an object represented on its face, said second sheet being inserted through said slits so that in the completed device the object on the second sheet will appear to be in the compartment shown on the first sheet.

Des Moines, Iowa, February 6, 1919.

ROBERT H. McDOWELL.